US006182934B1

(12) United States Patent
Kelley

(10) Patent No.: US 6,182,934 B1
(45) Date of Patent: Feb. 6, 2001

(54) MEANS AND METHOD FOR HANGING A LOAD CHART ON A DELIVERY VEHICLE

(76) Inventor: Jay M. Kelley, P.O. Box 651, Dubuque, IA (US) 52004

( * ) Notice: Under 35 U.S.C. 154(b), the term of this patent shall be extended for 0 days.

(21) Appl. No.: 09/459,281

(22) Filed: Dec. 17, 1999

(51) Int. Cl.[7] .............................. F16B 45/00; A47H 1/16
(52) U.S. Cl. .......................... 248/304; 248/302; 248/303
(58) Field of Search .................................. 248/304, 301, 248/302, 303, 215, 318, 317, 323, 324, 62; 47/67

(56) References Cited

U.S. PATENT DOCUMENTS

| | | | | |
|---|---|---|---|---|
| D. 292,755 | | 11/1987 | Shay . | |
| D. 324,782 | | 3/1992 | Pedersen . | |
| 1,557,955 | | 10/1925 | Young . | |
| 3,461,584 | | 8/1969 | Wilson . | |
| 4,193,504 | | 3/1980 | Berkowitz . | |
| 4,235,407 | * | 11/1980 | Haas | 248/318 |
| 4,269,381 | | 5/1981 | Harms . | |
| 4,576,290 | | 3/1986 | Zigman . | |
| 4,669,615 | | 6/1987 | Zigman . | |
| 4,691,473 | * | 9/1987 | Ragen | 47/67 |
| 4,779,377 | * | 10/1988 | Davis | 47/67 |
| 4,811,475 | * | 3/1989 | Morton, Jr. | 248/317 |
| 4,884,524 | | 12/1989 | Minotti . | |
| 4,979,712 | * | 12/1990 | Rios | 248/304 |
| 5,386,960 | * | 2/1995 | O'Brien | 248/324 |
| 5,542,314 | | 8/1996 | Sullivan et al. . | |
| 5,588,237 | | 12/1996 | Chase et al. . | |
| 5,816,558 | * | 10/1998 | Sommer et al. | 248/303 |

* cited by examiner

*Primary Examiner*—Anita M. King
*Assistant Examiner*—Jerome DeLuca
(74) *Attorney, Agent, or Firm*—Zarley, McKee, Thomte, Voorhees & Sease

(57) ABSTRACT

A hanger for hanging a load chart on a delivery vehicle includes a hanging bracket and a self-balancing mounting arm. The hanging bracket has a hooked upper end and a lower end formed into an eye that the self-balancing mounting arm slides through. The mounting arm has a central portion and opposite hooked lower ends adapted to be removably inserted into holes in the load chart, the hooked lower ends each extending from the central portion in a direction that is generally opposite from the hooked upper end of the first rod. The hanger provides a unique method of hanging a load chart on a vehicle.

13 Claims, 2 Drawing Sheets

MEANS AND METHOD FOR HANGING A LOAD CHART ON A DELIVERY VEHICLE

BACKGROUND OF THE INVENTION

The present invention relates to the field of delivery services. More particularly, this invention relates to a means and method for hanging a load chart on a delivery vehicle.

In the field of delivery services, it is common for delivery persons to use a clipboard or a load chart when loading, unloading and organizing the contents of the vehicle to ensure efficient delivery. Various delivery papers are conventionally held on the load chart. It is desirable for the load chart to be detachably mounted to the vehicle, but existing methods typically allow the load chart to scratch the vehicle. Thus, there is a need to hang a detachable load chart from a delivery vehicle without damaging the vehicle or marring its paint job.

Therefore, the primary objective of the present invention is the provision of a means and method for hanging a detachable load chart on a delivery vehicle without damaging the vehicle.

Another objective of the present invention is the provision of a means and method for hanging a load chart on an existing structure of a delivery vehicle, such as a drip rail or rain gutter.

Another objective of this invention is a provision of a means for hanging a load chart on a delivery vehicle that is economical to produce, easy to use, and durable and reliable in use.

These and other objectives will be apparent to one skilled in the art from the drawings, as well as from the description and the claims which follow.

SUMMARY OF THE INVENTION

The present invention relates to the field of devices and methods used in conjunction with delivery vehicles and services. More particularly, this invention relates to a hanging bracket for detachably mounting a load chart on a vehicle, such as a medium-sized delivery truck.

The means and method described herein utilizes a simple two-piece hanging bracket to hang the load chart from a drip rail that is often provided as standard equipment on a conventional delivery truck.

DETAILED DESCRIPTION OF THE PREFERRED EMBODIMENT

Figure 1:
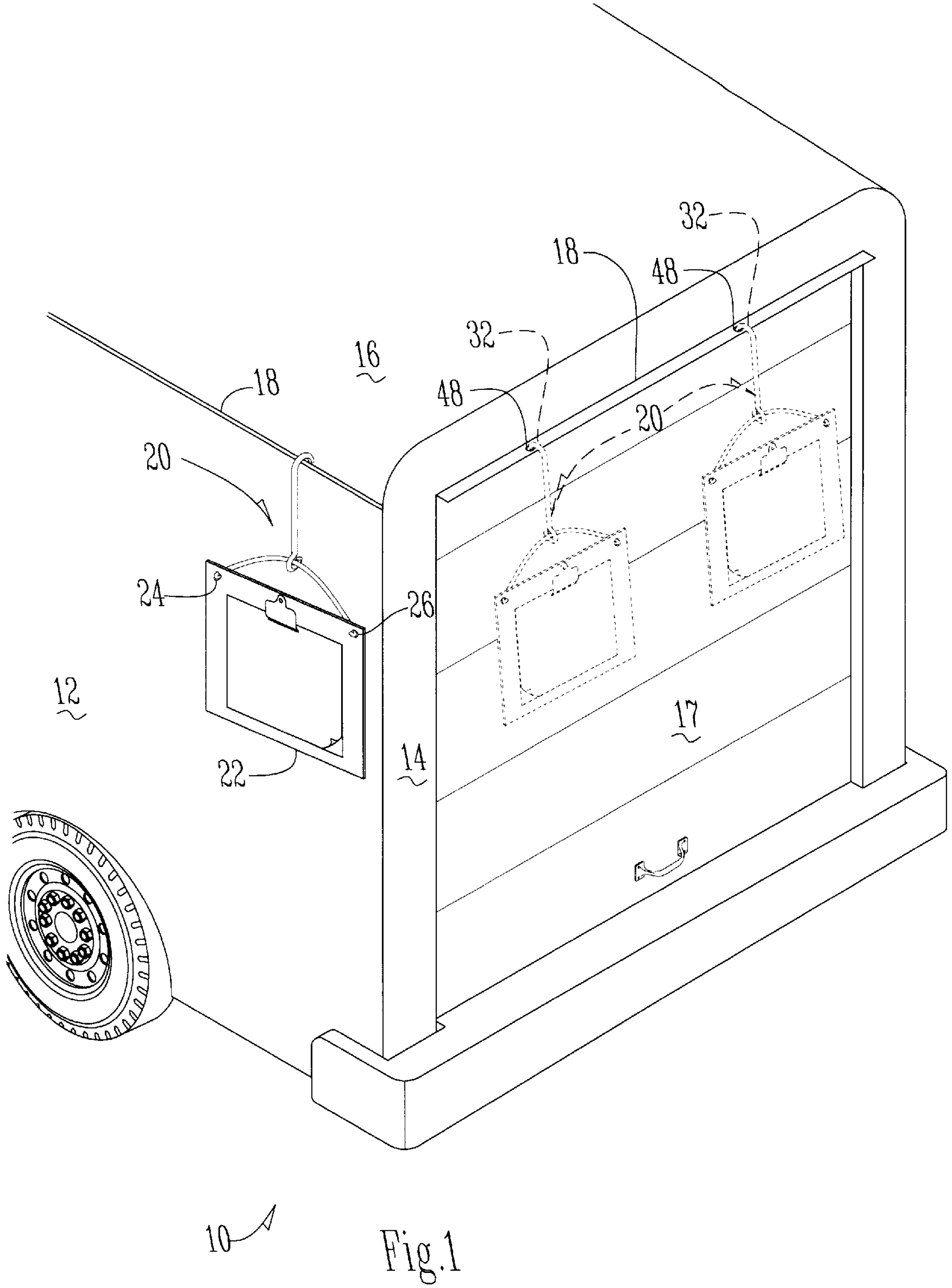
FIG. 1 is a perspective view of a delivery vehicle equipped with the load chart hanger of the present invention.

In FIG. 1, the rear corner of a medium-sized delivery vehicle 10 is shown. The vehicle 10 has a side wall 12, a rear wall 14, and a roof 16. A door 17 is typically provided in the rear wall 14. Furthermore, a drip rail or rain gutter 18 extends in a substantially horizontal direction at the intersection of the side wall 12 and the roof 16. A similar drip rail 18 can be provided above the door 17.

Figure 2:
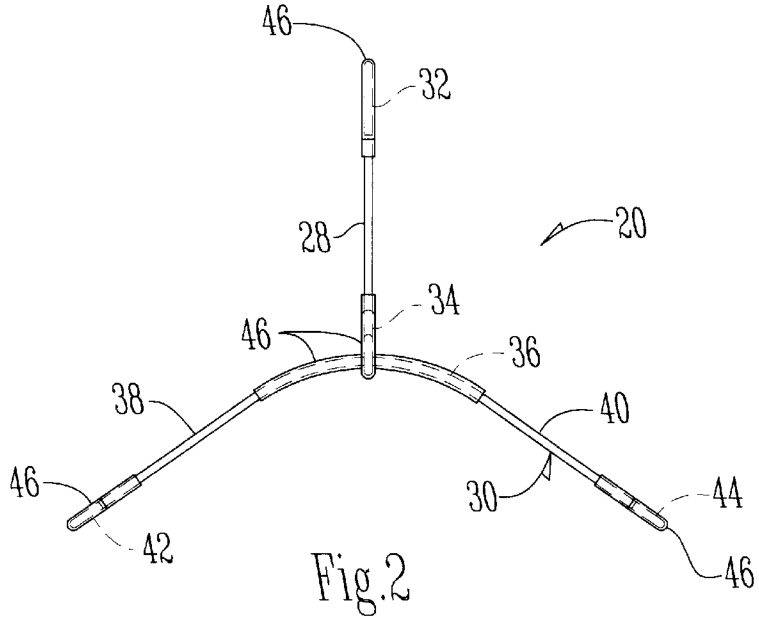
FIG. 2 is a front elevation view of the load chart hanger of this invention.
Figure 3:
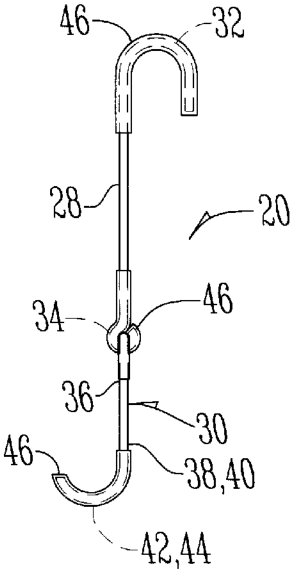
FIG. 3 is a right side elevation view of the load chart hanger of FIG. 2.
Figure 4:
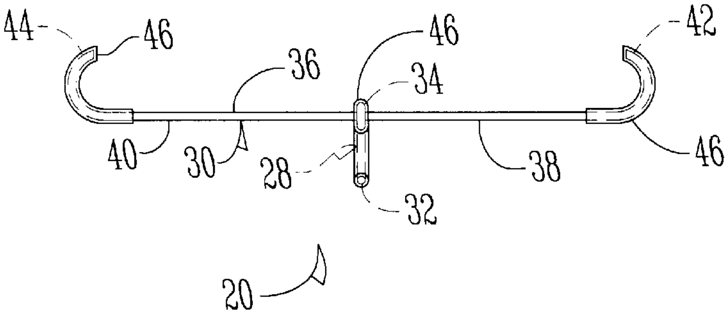
FIG. 4 is a bottom view of the load chart hanger of this invention with the plastic coating removed for greater clarity.

The load chart hanger 20 of this invention hangs a load chart 22 having a pair of horizontally spaced apart holes 24, 26 therein from the drip rail 18 of the vehicle 10. In FIGS. 2–4, the load chart hanger 20 is shown in greater detail.

The load chart hanger 20 includes a hanging bracket 28 and a self-balancing mounting arm 30 pivotally and slidingly mounted thereto. The hanging bracket 28 is a substantially rigid elongated cylindrical rod with a hooked upper end 32 and an eye 34 formed on the lower end. The hooked upper end 32 and the eye 34 are coplanar. The eye 34 includes a loop formed at the lower end of the first rod or hanging bracket 28. The loop has a gap therein of a given width.

Preferably, the hooked end 32 of the hanging bracket 28 is coated with a layer of plastic material so that it will not damage or mar the finish on the vehicle 10. Furthermore, such plastic coating provides additional frictional forces for retaining the hanging bracket 28 in one position and the drip rail 18. A layer of plastic coating can also be provided on the eye 34 to prevent scratching the vehicle 10.

The hanger 20 further includes a self-balancing mounting arm 30 that is pivotally and slidingly mounted to the eye 34 of the hanging bracket 28. The self-balancing mounting arm 30 includes an elongated second rod having a diameter or width greater than the width of the gap in the eye 34 so that the second rod cannot be removed from the eye through the gap. Thus, the mounting arm 30 is pivotally mounted and constrained in one direction within the eye 34. More particularly, the central portion 36 of the elongated second rod or mounting arm 30 pivots and is axially slidable within the eye 34. The mounting arm 30 or second rod is substantially rigid and cylindrical.

The central portion 36 passes through the eye 34 and has a bend in it. For ease of manufacturing and optimum self-balancing the bend covers less than 180 degrees so that the second rod does not loop around itself or pass through the eye a second time.

The central portion 36 includes a pair of angled legs 38, 40 joined together at an apex. The central portion 36 forms an inverted V shape and the legs 38, 40 terminate respectively at hooked lower end 42, 44. The central portion 36 is elevated above the hooked lower ends 42, 44. Each of the lower hooked ends 42, 44 bends outwardly, then upwardly and backwardly toward its respective leg 38, 40 so that each of the lower hooked ends 42, 44 is coplanar with its respective leg 38, 40.

As best seen in FIG. 1, the hooked lower ends 42, 44 are adapted to removably inserted into the mounting holes 24, 26 of the load chart 22. The hooked lower ends 42, 44 each extend in a direction that is generally opposite from the direction which the hooked end 32 of the hanging bracket 28 extends. Thus, the hooked upper end 32 and the hooked lower ends 42, 44 are disposed in three different planes because of their opposing orientations and the bend in the central portion 36. The hooked lower ends 42, 44 are preferably coated with plastic as well.

The present invention provides a method of detachably mounting a load chart 22 on a delivery vehicle 10. The method comprises the following steps: providing a substantially horizontal support member 18 on the vehicle 10; providing a load chart hanger 20 that includes a hanging bracket 28 and a self-balancing mounting arm 30, the hanging bracket 28 comprising an elongated first rod with a hooked upper end 32 and a lower end formed into an eye 34, the hooked upper end 32 and the eye 34 being coplanar; pivotally mounting the self-balancing mounting arm 30 through the eye 34 of the hanging bracket 28, the mounting arm 30 including an elongated second rod with opposite hooked lower ends 42, 44 and a central portion 36 therebetween pivotally and slidably mounted in the eye 34 of the first rod, the hooked lower ends 42, 44 each extending from the central portion 36 in a direction that is generally opposite from the hooked upper end 32 of the first rod; hanging the hanging bracket 28 from the support member 18 on the vehicle 10; providing a load chart 22 with a pair of horizontally spaced mounting holes 24, 26 therein; and inserting the hooked lower ends 42, 44 of the mounting arm 30 respectively into the mounting holes 24, 26 in the load chart 22 to detachably mount it to the mounting arm 30. The hooked upper end 32 of the hanging bracket 28 is particularly well adapted to mount the load chart 22 from the drip rail 18 of the vehicle 10.

FIG. 1 illustrates with dashed lines that the load chart hanger 20 can be mounted to the vehicle 10 in a variety of locations and ways. For example, when a substantially horizontal drip rail 18 is provided above the door 17 at the rear 14 of the vehicle 10, one or more holes 48 are drilled vertically through the rear drip rail 18 to receive the hooked upper end 32 of the hanger 20. In fact, the load chart hanger 20 of this invention can be used to mount the load chart 22 to other support members on the vehicle. A lip or a hole (vertical or horizontal) on the vehicle 10 is all that is necessary. The hooked upper end 32 can be inserted therein to hang the load chart 22.

Therefore, it can be seen that the present invention at least achieves its stated objectives.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. An apparatus for hanging a load chart on a delivery vehicle comprising:

a hanging bracket including an elongated first rod with a hooked upper end and a lower end formed into an eye, the hooked upper end and the eye being coplanar;

a self-balancing mounting arm including an elongated second rod with a central portion pivotally and slidably mounted to the eye of the first rod and opposite hooked lower ends adapted to be removably inserted into holes in a load chart, the hooked lower ends each extending from the central portion in a direction that is generally opposite from the hooked upper end of the first rod;

wherein the central portion of the second rod is elevated above the hooked lower ends and has an inverted V shape defined by a pair of legs joined together at an apex, each leg of the pair of legs terminating at one of the hooked lower ends each of the lower ends bending forwardly then upwardly and backwardly in a plane that fully includes its respective leg so that each of the lower hooked ends is coplanar with its respective leg and nonparallel and nonperpendicular to the plane that includes the hooked upper and the eye of the first rod.

2. The apparatus of claim 1 wherein the central portion of the second rod passes through the eye and is bent less than 180 degrees.

3. The apparatus of claim 1 wherein the first rod is cylindrical.

4. The apparatus of claim 1 wherein the second rod is cylindrical.

5. The apparatus of claim 1 wherein the hooked upper end of the first rod is coated with plastic.

6. The apparatus of claim 1 wherein the hooked lower ends of the second rod are coated with plastic.

7. The apparatus of claim 1 wherein the eye comprises a loop formed at the lower end of the first rod, the loop having a gap therein of a given width and the central portion of the second rod having a diameter greater than the width of the gap so that the second rod cannot be removed from the eye through the gap.

8. The apparatus of claim 1 wherein the hooked upper end and the hooked lower ends are disposed in three distinct planes.

9. The apparatus of claim 1 wherein the first and second rods are substantially rigid.

10. A method of hanging a load chart on a delivery vehicle comprising:

providing a support member on the vehicle;

providing a load chart hanger that includes a hanging bracket comprising an elongated first rod with a hooked upper end and a lower end formed into an eye, the hooked upper end and the eye being coplanar;

pivotally mounting a self-balancing mounting arm through the eye of the hanging bracket, the mounting arm including an elongated second rod with a central portion pivotally and slidably mounted in the eye of the first rod, and a pair of legs extending in generally opposite direction from the central portion, the legs respectively including hooked lower ends that bend forwardly then upwardly and backwardly in a plane that includes its respective leg so that each of the lower hooked ends is coplanar with its respective leg and nonparallel and nonperpendicular to the plane that includes the hooked upper end and the eye of the first rod;

hanging the hanging bracket from the support member on the vehicle;

providing a load chart with a pair of horizontally spaced mounting holes therein; and inserting the hooked lower ends of the mounting arm respectively into the mounting holes in the load chart to detachably mount the load chart to the mounting arm.

11. The method of claim 10 wherein the support member on the vehicle is a substantially horizontal elongated drip rail.

12. The method of claim 11 wherein the vehicle has a roof and a side wall intersecting the roof, the drip rail extending along the intersection of the side wall and the roof of the vehicle.

13. The method of claim 11 wherein the vehicle has a rear wall and the drip rail extends from the rear wall, the drip rail having a hole therein extending vertically for receiving the hooked upper end of the first rod; the step of hanging the hanging bracket from the support member comprising inserting the hooked upper end of the first rod into the hole in the drip rail.

* * * * *